US009485977B2

(12) United States Patent
Shimizu et al.

(10) Patent No.: US 9,485,977 B2
(45) Date of Patent: Nov. 8, 2016

(54) FISHING SPINNING REEL (71) Applicant: Globeride, Inc., Tokyo (JP)

(72) Inventors: Yoshihito Shimizu, Tokyo (JP);
Wataru Tsutsumi, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 104 days.

(21) Appl. No.: 14/486,374

(22) Filed: Sep. 15, 2014

(65) Prior Publication Data
US 2015/0090819 A1    Apr. 2, 2015

(30) Foreign Application Priority Data

Sep. 27, 2013  (JP) ................................ 2013-200923
Sep. 27, 2013  (JP) ................................ 2013-200924

(51) Int. Cl.
*A01K 89/01* (2006.01)
*A01K 89/015* (2006.01)
*A01K 89/00* (2006.01)

(52) U.S. Cl.
CPC ........... *A01K 89/015* (2013.01); *A01K 89/006* (2013.01); *A01K 89/01* (2013.01); *A01K 89/0114* (2013.01)

(58) Field of Classification Search
CPC ..................... A01K 89/01; A01K 89/011223; A01K 89/0114
See application file for complete search history.

(56) References Cited

U.S. PATENT DOCUMENTS

| 6,199,783 | B1 * | 3/2001 | Ito ...................... A01K 89/0114 242/321 |
| 6,224,006 | B1 * | 5/2001 | Yamaguchi ............ A01K 89/01 242/241 |
| 6,457,661 | B1 * | 10/2002 | Young ................ A01K 89/0114 242/241 |
| 7,314,192 | B2 | 1/2008 | Kitajima et al. |
| 2004/0075004 | A1 * | 4/2004 | Miyasaka ............... A01K 89/01 242/223 |
| 2004/0124299 | A1 * | 7/2004 | Tsutsumi ............... A01K 89/01 242/249 |
| 2004/0200917 | A1 * | 10/2004 | Nishikawa ............. A01K 89/01 242/311 |

(Continued)

FOREIGN PATENT DOCUMENTS

| CN | 1496679 | 5/2004 |
| CN | 1926977 | 3/2007 |

(Continued)

OTHER PUBLICATIONS

Extended European Search Report dated May 12, 2015.

(Continued)

*Primary Examiner* — Emmanuel M Marcelo
(74) *Attorney, Agent, or Firm* — Pillsbury Winthrop Shaw Pittman, LLP (57) ABSTRACT The present invention provides a fishing spinning reel in which handle operation in high load winding is smooth. Specifically, the fishing spinning reel includes: a pinion gear having a rotor fixed on an end of the pinion gear and meshing with a drive gear rotationally driven by rotational operation of a handle rotatably supported on the reel body; a spool shaft inserted through the pinion gear and having a spool mounted on a front end thereof, the spool holding a fishing line wound therearound; and an oscillation mechanism configured to reciprocate the spool shaft back and forth in accordance with drive of the drive gear, wherein the spool shaft is not supported at a region from a meshing region between the drive gear and the pinion gear to a rear end of the spool shaft where the spool shaft is supported by a slidable body of the oscillation mechanism.

10 Claims, 6 Drawing Sheets

(56) References Cited

U.S. PATENT DOCUMENTS

| | | | |
|---|---|---|---|
| 2004/0206840 A1* | 10/2004 | Kitajima | A01K 89/01 242/306 |
| 2004/0227028 A1* | 11/2004 | Nishikawa | A01K 89/01 242/249 |
| 2005/0045758 A1* | 3/2005 | Ban | A01K 89/0114 242/242 |
| 2005/0082405 A1* | 4/2005 | Sugawara | A01K 89/01 242/223 |
| 2005/0127221 A1* | 6/2005 | Morise | A01K 89/0114 242/242 |
| 2005/0145735 A1* | 7/2005 | Ikuta | A01K 89/01 242/307 |
| 2005/0274838 A1* | 12/2005 | Sugahara | A01K 89/0111 242/306 |
| 2007/0057105 A1 | 3/2007 | Kitajima et al. | |
| 2007/0181727 A1* | 8/2007 | Kitajima | A01K 89/015 242/241 |
| 2009/0072066 A1* | 3/2009 | Saito | A01K 89/0114 242/273 |

FOREIGN PATENT DOCUMENTS

| | | |
|---|---|---|
| EP | 0 649 595 | 4/1995 |
| EP | 1 402 775 | 3/2004 |
| JP | 2001-258438 | 9/2001 |
| JP | 2006-333705 | 12/2006 |

OTHER PUBLICATIONS

European Search Report dated Feb. 16, 2015 for Appln. No. 14184671.7.

Chinese Office Action dated Apr. 18, 2016 for Appln. No. 201410483246.9.

Taiwanese Office Action dated Jul. 14, 2016 for Appln. No. 103132031.

* cited by examiner

Fig. 8

FISHING SPINNING REEL

CROSS-REFERENCE TO RELATED APPLICATIONS

This application is based on and claims the benefit of priority from Japanese Patent Application Serial No. 2013-200923 (filed on Sep. 27, 2013) and Japanese Patent Application Serial No. 2013-200924 (filed on Sep. 27, 2013), the contents of which are hereby incorporated by reference in their entirety.

TECHNICAL FIELD

The present invention relates to a fishing spinning reel and, particularly to a fishing spinning reel characterized in support structure of a pinion gear and a spool shaft inserted through the pinion gear wherein the pinion gear is adapted to be rotationally driven by a drive gear and the spool shaft is adapted to support a spool around which a fishing line is wound so as to allow reciprocating back and forth movement thereof.

BACKGROUND

Conventionally, a fishing spinning reel includes a rotor rotationally driven by rotational handle operation and a spool around which a fishing line is wound and which is reciprocated back and forth. As generally known, the rotor is fixed with a rotor nut on the front end of a pinion gear meshing with a drive gear mounted on a handle shaft and supported so as to be rotatable in a direction orthogonal to the handle shaft, such that the rotor is rotationally driven. The spool shaft is inserted through the pinion gear and reciprocated back and forth by an oscillation mechanism (reciprocation device) driven by the drive gear.

When the handle is rotationally operated to rotate the pinion gear, the spool shaft is reciprocated while being inserted through the rotating pinion gear; therefore, when the spool undergoes such a large load as to bend the spool shaft, the contact pressure between the inner surface of the pinion gear and the spool shaft is increased, resulting in increased slide resistance on the spool shaft and nonsmooth handle operation.

To overcome these problems, it is known to form a recess (gap) in the inner surface of the pinion gear along the axial direction to maintain a clearance between the inner surface of the pinion gear and the spool shaft, as disclosed in Japanese Patent Application Publication No. 2001-258438 (the "'438 Publication"). In the '438 Publication, the spool shaft is partially supported at regions except the recess. More specifically, the '438 Publication discloses a spinning reel wherein a spool shaft is supported at two points in the pinion gear ('438 Publication, FIGS. 5 and 6). Also disclosed in the '438 Publication is a spinning reel wherein a spool shaft is supported in the pinion gear at one point near the front end of the pinion gear and the spool shaft is supported by the reel body near the back of the pinion gear (id, FIG. 7).

The pinion gear is meshed with the drive gear to receive the rotational drive force. The pinion gear has teeth on the back side thereof and, at this portion (the meshing region meshing with the drive gear), the pinion gear is subjected to a large downward load (toward the spool shaft inserted) when the handle is rotationally operated to deliver the power. In the above related art, the spool shaft is supported at two points both within the pinion gear, or supported at two points one of which is on the front portion of the pinion gear and the other is on the reel body near the rear end of the pinion gear. Thus, the supporting portions supporting the spool shaft are relatively close to the meshing region between the drive gear and the pinion gear in the axial direction.

If such a supporting portion is in the meshing region, the downward load is applied directly to the supporting portion in the meshing region. The downward load produces frictional slide resistance on the outer circumferential surface of the spool shaft when reciprocating back and forth, which results in unfavorable nonsmooth handle operation. If the supporting portions are not in the meshing region and the spool shaft is supported at a portion near the rear end of the pinion gear (close to the tooth portion), when a downwardly urging load is applied to the pinion gear upon rotation of the handle, a force tends to bend the spool shaft via the supporting portion in front of the meshing region. This force radially deforms (into an ellipse) a bearing supporting the outer circumference of the spool shaft at the supporting portion near the rear end of the pinion gear, producing frictional slide resistance on the spool shaft reciprocating back and forth and resulting in nonsmooth handle operation. That is, supporting a spool shaft on the inner surface of the pinion gear in the meshing region or supporting the spool shaft on the reel body behind the pinion gear over a short distance across the meshing region may produce slide resistance on the spool shaft when a downward load is applied to the pinion gear in high load winding. This slide resistance negatively affects smooth rotational operation of the handle.

SUMMARY

The present invention is intended to overcome the above problems. One object of the present invention is to provide a fishing spinning reel in which handle operation in high load winding is smooth.

The present invention provides a fishing spinning reel comprising: a reel body; a pinion gear adapted to mesh with a drive gear rotationally driven by rotational operation of a handle rotatably supported on the reel body, the pinion gear being fixed on an end of the pinion gear; a spool shaft adapted to be inserted through the pinion gear; a spool mounted on a front end of the spool shaft, wherein the spool is adapted to hold a fishing line therearound; and an oscillation mechanism adapted to reciprocate the spool shaft back and forth in accordance with drive of the drive gear, wherein the spool shaft is supported, at its rear end, by a slidable body of the oscillation mechanism; and wherein the spool shaft is not supported throughout an area from a meshing region between the drive gear and the pinion gear to the rear end of the spool shaft.

In the above fishing spinning reel, a portion of the spool shaft between the meshing region between the drive gear and the pinion gear and the supporting portion of the slidable body is kept unsupported (noncontact). Therefore, although, upon rotation of the handle, a large load (a load urging the pinion gear downward) is applied to the meshing region between the drive gear and the pinion gear, such a portion is not in contact with the spool shaft therefore, if the pinion gear is bent, the portion does not contact with the spool shaft and thus does not produce slide resistance. Further, the spool shaft is supported on the inner surface of the pinion gear in front of the meshing region; and when a large load is applied to the pinion gear, a force is applied via the supporting portion to the spool shaft so as to bend the spool shaft. Even under such a force, the spool shaft which is not supported on the reel body near the rear end of the pinion gear is free of slide resistance. That is, even if the spool shaft driven back and forth via the oscillation mechanism is subjected to a large load at the meshing region meshing with the pinion gear during winding operation of the handle, no slide resistance affecting the winding operation of the handle is applied to the spool shaft, and thus smooth winding operation is possible.

As described above, the present invention provides a fishing spinning reel in which handle operation in high load winding is smooth.

BRIEF DESCRIPTION OF THE DRAWINGS

FIG. 3-1 shows a variation 1 of the slidable body of the oscillation mechanism shown in FIG. 2.

FIG. 3-2a shows a variation 2 of the slidable body of the oscillation mechanism shown in FIG. 2.

FIG. 3-2b shows another variation 2 of the slidable body of the oscillation mechanism shown in FIG. 2.

DESCRIPTION OF EXAMPLE EMBODIMENTS

Figure 1:
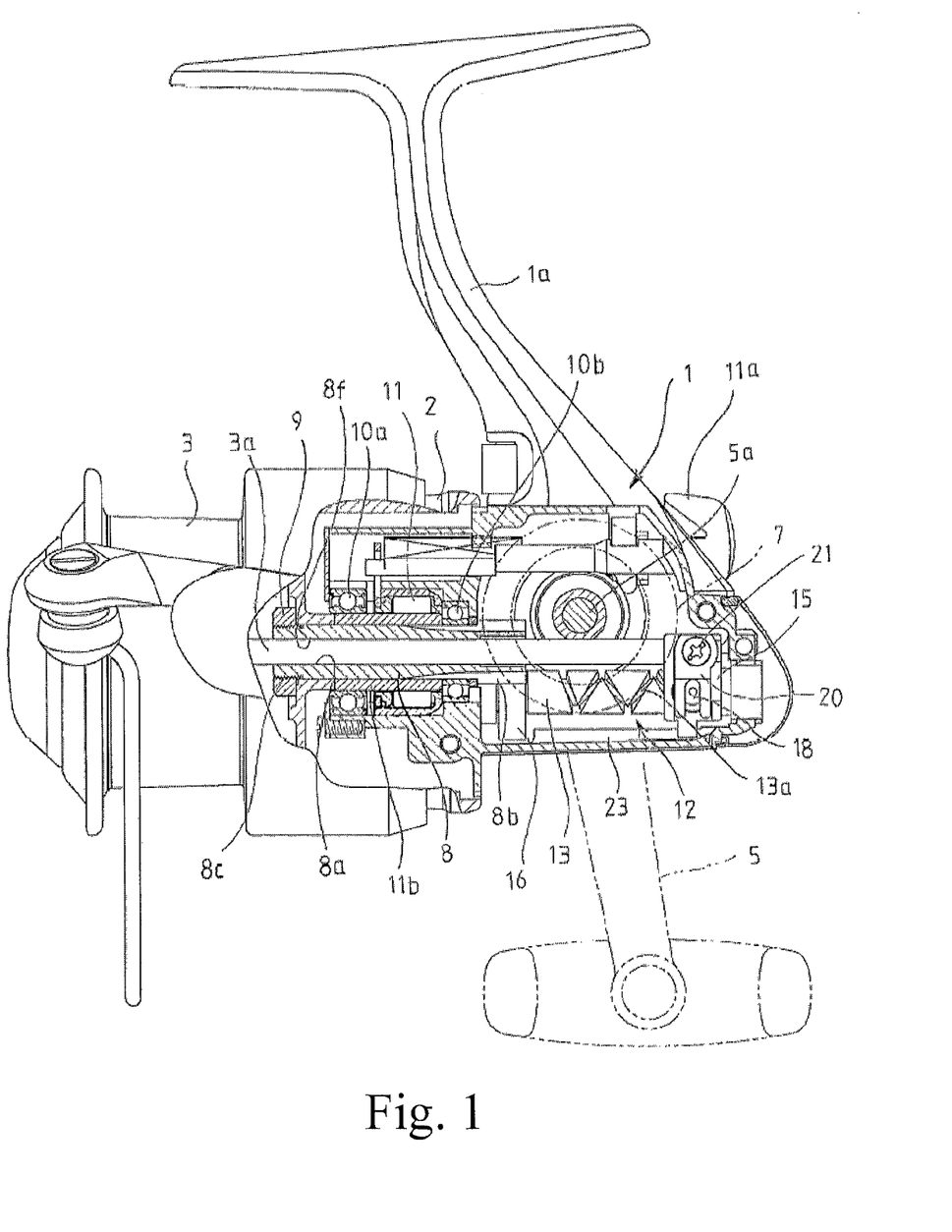
FIG. 1 shows a first embodiment of the fishing spinning reel according to the present invention, showing internal structure thereof.
Figure 2:
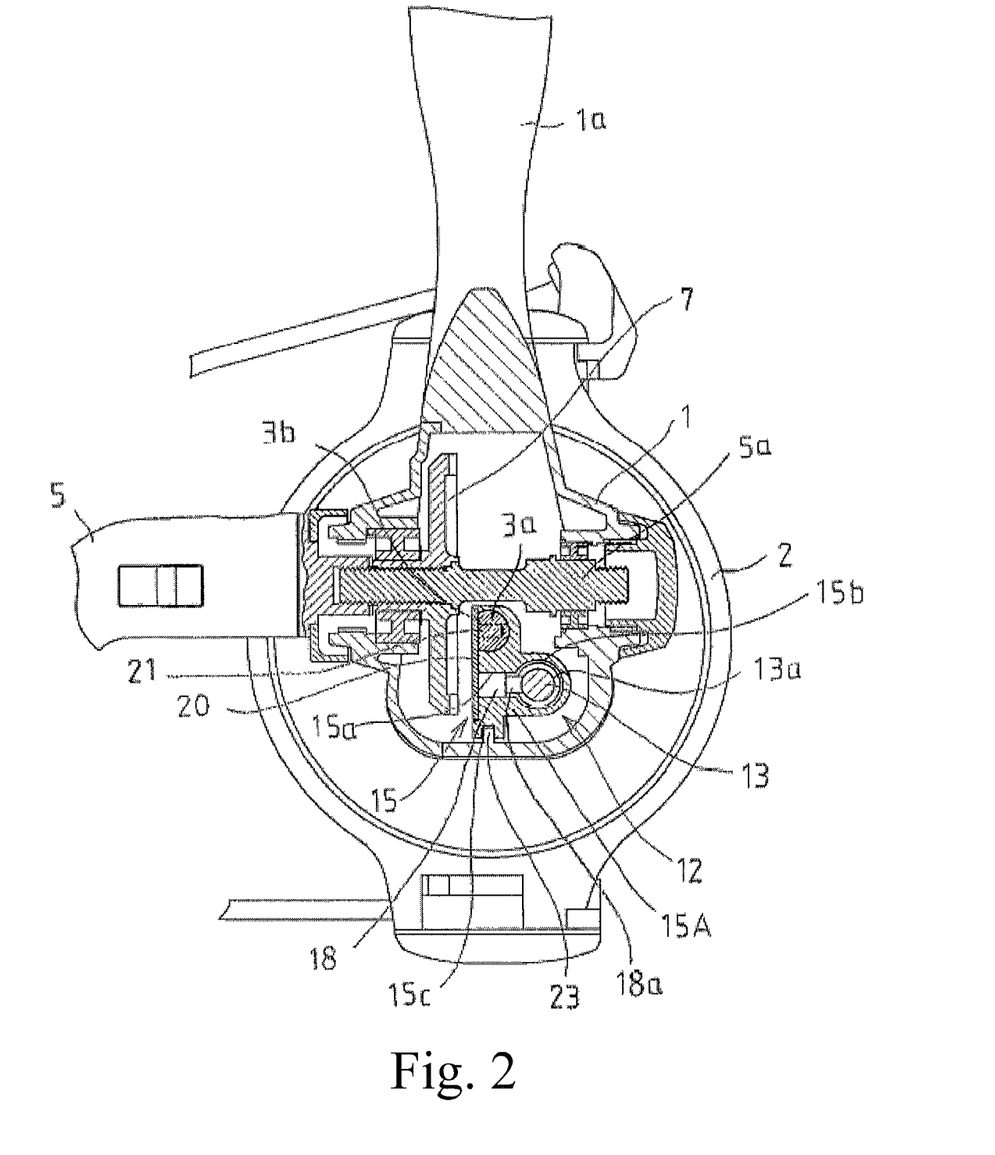
FIG. 2 is a partially sectional view of the fishing spinning reel shown in FIG. 1 as viewed from behind.
Figures 2A, 3:
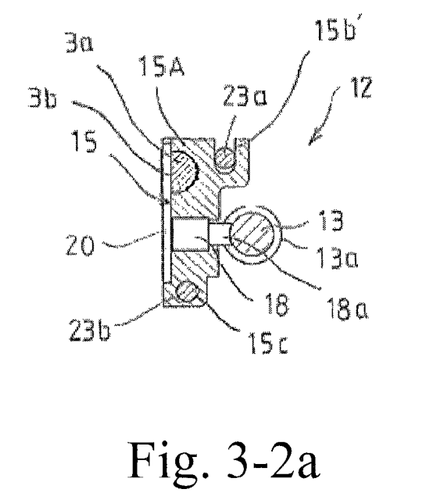
Figures 2B, 3:
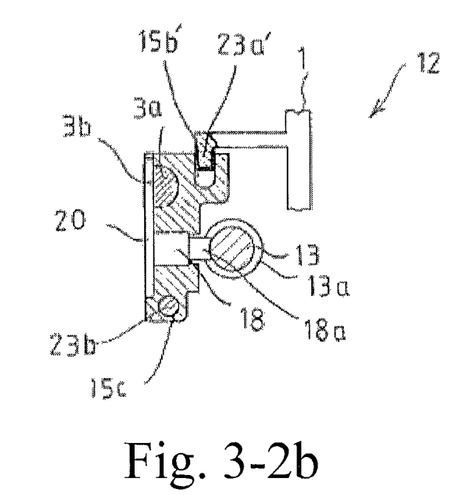
Figure 4:
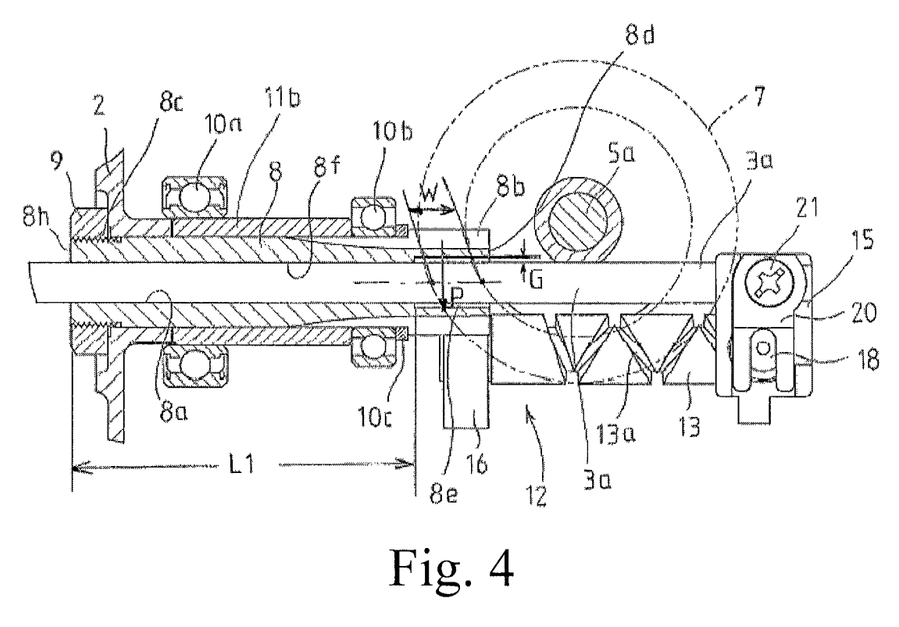
FIG. 4 is an enlarged view of an important portion shown in FIG. 1.

Embodiments of a fishing reel according to the present invention will be hereinafter described with reference to the drawings. FIGS. 1 to 4 show the first embodiment of the fishing spinning reel according to the present invention, wherein FIG. 1 shows the internal structure thereof, FIG. 2 is a partially sectional view of the fishing spinning reel shown in FIG. 1 as viewed from behind, FIGS. 3-1, 3-2a, and 3-2b show variations of the slidable body of the oscillation mechanism shown in FIG. 2, and FIG. 4 is an enlarged view of an important portion shown in FIG. 1.

The reel body 1 of the fishing spinning reel may be integrated with a reel leg 1a to be mounted on a fishing rod; and the reel body 1 may include, in front of the reel leg 1a, a rotor 2 rotatably supported and a spool 3 supported so as to be able to move back and forth in synchronization with the rotation of the rotor 2.

In the reel body 1, a handle shaft 5a may be rotatably supported and may have a handle 5 mounted on a projecting end thereof. The handle shaft 5a may be engaged with a winding driving mechanism, which may be mounted on the handle shaft 5a and include a drive gear 7 having internal teeth, and a pinion gear 8 meshing with the drive gear 7, extending in the direction orthogonal to the handle shaft 5a, and having therein a hollow portion 8a extending axially.

The pinion gear 8 may have a tooth portion 8b formed in the rear end thereof; and the tooth portion 8b may mesh with the drive gear 7. The meshing region between these gears may have a length W shown in FIG. 4.

In the front end of the pinion gear 8, a male screw 8c is formed, and the front end of the pinion gear may be fitted into a central hole of the rotor 2; and a rotor nut 9 may be screwed on the front end of the pinion gear. Thus, the rotor 2 may be fixed on the pinion gear 8.

The pinion gear 8 of this embodiment may be rotatably supported by the reel body 1 at two points in front of the meshing region W (on the spool side) via the bearings 10a, 10b; and the pinion gear 8 may have a hollow portion 8a into which the spool shaft 3a extending in the direction orthogonal to the handle shaft 5a may be inserted so as to be movable in the axial direction. The spool 3 may be mounted on the front end of the spool shaft 3a. In this case, on the outer circumference of the middle region of the pinion gear 8 may be provided a publicly known one-way clutch 11. The rotation status of the pinion gear (rotor) may be switched by switching the switching lever 11a rotatbly supported on the back of the reel body 1 (switching between bidirectional rotation and single-direction rotation for winding the line). The bearing 10a may be disposed on the front side between an inner ring 11b of the one-way clutch 11 locked on the pinion gear 8 and the reel body 1; and the bearing 10b may be disposed via a washer 10c on the back side near the meshing region W.

The pinion gear 8 may be engaged with a reciprocation device (oscillation mechanism) 12 for reciprocating the spool 3 (spool shaft 3a) back and forth. The reciprocation device 12 of this embodiment may include a worm shaft 13 rotatably supported within the reel body and extending in parallel with the spool shaft 3a and a slidable body (oscillating slider) 15 fixed on the rear end of the spool shaft 3a. On the front end of the worm shaft 13 may be provided an oscillation gear 16 meshing with the pinion gear 8. When the handle 5 is rotated, the worm shaft 13 may be rotationally driven via the drive gear 7, pinion gear 8, and the oscillation gear 16.

The worm shaft 13 may have a spiral cam groove 13a formed therein along the axial direction; and the cam groove 13a may be engaged with the engagement lug 18a of the engagement pin 18 housed in the slidable body 15 described later.

The slidable body 15 may include a body 15A having a cylindrical housing hole 15a; and the body 15A may be mounted on the rear end of the spool shaft 3a to support the rear end of the spool shaft 3a. In the rear end of the spool shaft 3a, there is formed a planar surface 3b having a noncircular section and extending orthogonally to the axis of the handle shaft. A retaining member (plate) 20 may be applied onto the planar surface 3b, and a setscrew 21 may be screwed into the planar surface 3b from the direction of the handle shaft. The spool shaft 3a may be unrotatably secured to the slidable body 15.

An engagement pin 18 having a cylindrical shape may be housed and supported in the cylindrical housing hole 15a of the body 15A. In one end (front end) of the engagement pin 18, an engagement lug 18a engaged with the cam groove 13a in the worm shaft 13 may be formed. The other end may be applied onto the retaining member 20 and retained thereby.

Figure 31:
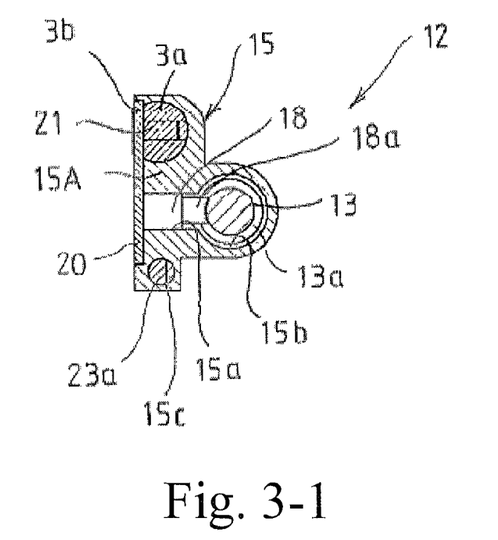

The body 15A may include an insertion portion 15b extending in the direction orthogonal to the housing hole 15a. The worm shaft 13 is inserted through the insertion potion 15b encompassing the worm shaft 13. The body 15A may have an engagement groove 15c extending axially which may be engaged with a convex guide rail 23 formed on the reel body 1 along the axial direction. Thus, the body 15A may be unrotatably secured and guided in the axial direction. The guidance of the slidable body 15 is not specifically limited. For example, as in the variation 1 shown in FIG. 3-1, a shaft 23a may be disposed along the axial direction of the spool shaft in the reel body, and the shaft 23a may be inserted through the body 15A to guide the slidable body 15.

FIGS. 3-2a and 3-2b show variations 2. In FIG. 3-2a, the slidable body 15 (the body 15A) may be supported by two guides arranged in the axial direction of the spool shaft so as to be able to move back and forth. The two guides in this embodiment may be two shafts 23a, 23b disposed in the reel body above and below the worm shaft 13 so as to be parallel with each other. The configurations of the two guides and the way of engagement of the body of the slidable body with a clearance are susceptible of various modifications. For example, as shown in FIG. 3-2a, the engagement groove may be a wide groove 15b' which is open at one end thereof such that the shaft 23a is engaged with the body 15A with a clearance. Alternatively, as shown in FIG. 3-2b, a guide rail 23a' may be integrally formed in the reel body along the axial direction of the spool shaft and engaged with the groove 15b' shown in FIG. 3-2a, instead of providing a shaft 23a in the reel body. Thus, forming the guide of a member constituting the reel body 1 reduces the number of parts and facilitates easy fabrication.

The pinion gear 8 of this embodiment may support the spool shaft 3a in front of the meshing region W. That is, the rear end portion of the pinion gear 8 may internally have a large diameter portion 8e extending beyond the meshing region W such that the spool shaft 3a bent under a load does not contact the inner surface of the pinion gear 8 at the meshing region W. The spool shaft 3a may be supported on the inner surface 8f of the pinion gear 8 in the region L1 in front of the meshing region W (i.e., supported at one point). In conventional spinning reels, a pinion gear may be constituted by brass (Bs), stainless steel (SUS), etc., and the spool shaft may be constituted by stainless steel (SUS), an aluminum alloy, etc. The size of the large diameter portion may be appropriately designed in accordance with the rigidity and bending properties of such constituents.

The rear portion of the spool shaft 3a from the meshing region to the slidable body 15 is not supported (by a bearing or a collar), and the rear end of the spool shaft 3a may be supported by the slidable body 15. That is, the spool shaft 3a may be supported by the inner surface of the pinion gear 8 in front of the meshing region and supported by the slidable body 15 at the rear end portion. The region therebetween does not contact other components.

In the above fishing spinning reel, when the handle 5 is rotated, the pinion gear 8 may be rotationally driven due to the meshing between the drive gear 7 and the pinion gear 8, and the rotor 2 may be rotationally driven. The worm shaft 13 of the reciprocation device 12 may be rotationally driven by the oscillation gear 16 meshing with the pinion gear 8, and the slidable body 15 may be stably reciprocated back and forth by the engagement pin 18 engaged with the cam groove 13a formed in the worm shaft 13. That is, when the handle 5 is operated for winding the line, the spool 3 may be reciprocated back and forth along with the spool shaft 3a supported by the slidable body 15 in synchronization with the rotation of the rotor 2.

When the handle 5 is rotationally operated, a large load (a load P downwardly urging the pinion gear 8) may be applied onto the meshing region W between the drive gear 7 and the pinion gear 8. In the meshing region W, the large diameter portion 8e may form a clearance G between the pinion gear 8 and the spool shaft 3a. Therefore, even if the load P bends the pinion gear 8, the pinion gear 8 does not contact the spool shaft 3a, and no slide resistance may be applied to the spool shaft. That is, rotational operation of the handle 5 is retained smooth. The clearance G may preferably be about 0.05 to 0.2 mm depending on, e.g., the size of the spinning reel, and the bending rigidity, diameter, and length of the spool shaft.

Further, the spool shaft 3a may be supported on a supporting portion (supporting region L1) in the inner surface of the pinion gear 8 in front of the meshing region W; therefore, when a large load is applied to the pinion gear 8, a force is applied via the supporting portion to the spool shaft 3a so as to bend the spool shaft 3a. Even under such a force, the spool shaft 3a which is not supported on the reel body near the rear end of the pinion gear is free of slide resistance applied by other components when sliding. That is, even if a large load is applied onto the pinion gear during winding operation of the handle, the spool shaft 3a is free of slide resistance, and the winding operation of the handle is retained smooth.

Further, the pinion gear 8 may be supported on the reel body 1 via a plurality of bearings 10a, 10b in front of the meshing region W; therefore, the pinion gear is stably rotated, and the bending of the pinion gear 8 may be restricted when a large load P is applied onto the meshing region W, resulting in reduced slide resistance on the spool shaft 3a.

Figure 5:
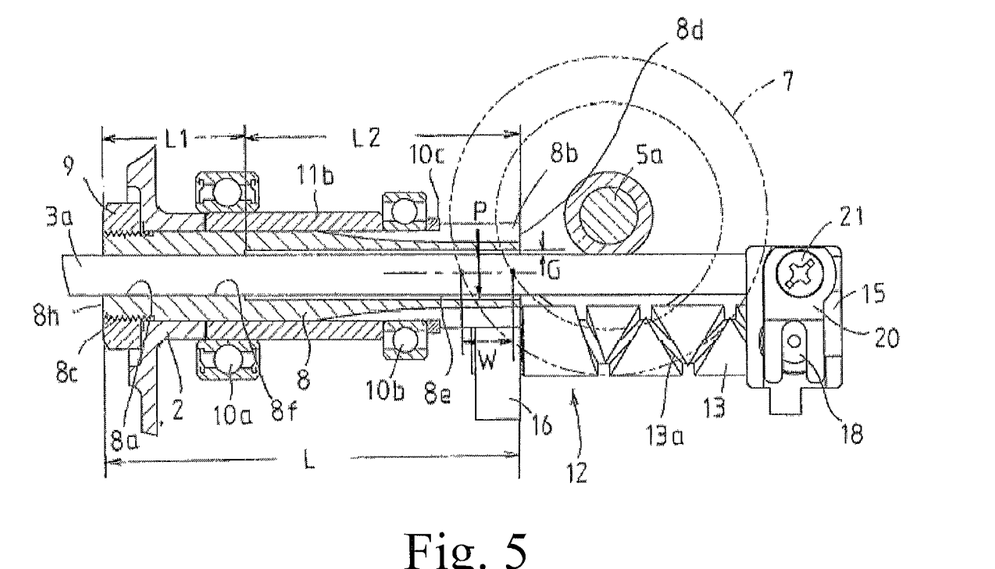
FIG. 5 shows a second embodiment of the fishing spinning reel according to the present invention, showing an enlarged view of an important portion of internal mechanism thereof.

FIG. 5 shows a second embodiment of the fishing spinning reel according to the present invention, showing an enlarged view of an important portion of internal mechanism thereof, as in FIG. 4. In the following description of the embodiment, the same elements as in the first embodiment will be denoted by the same reference numerals and detailed descriptions thereof will be omitted.

In this embodiment, the large diameter portion 8e of the first embodiment is made deeper, and the supporting region L1 in front of the meshing region W is shorter. That is, since the large diameter portion 8e is made deeper, the contact area with the spool shaft 3a (the supporting region L1) is reduced. Thus, the slide resistance on the spool shaft 3a during application of a large load P can be reduced, and the weight of the pinion gear can be reduced. More specifically, for an entire length L of the pinion gear 8, the region L2 over which the large diameter portion 8e is formed may preferably be 80% or less of the entire length L of the pinion gear. This may enable weight reduction of the pinion gear 8 and reduction of the contact area (supporting region) with the spool shaft 3a, thereby smoothing the handle rotation. Although the large diameter portion should preferably extend at least beyond the meshing region W, it may also be possible that the large diameter portion extend beyond the middle point of the meshing region W (over the half of the meshing region) such that a certain level of effect is achieved over the conventional arts.

Figure 6:
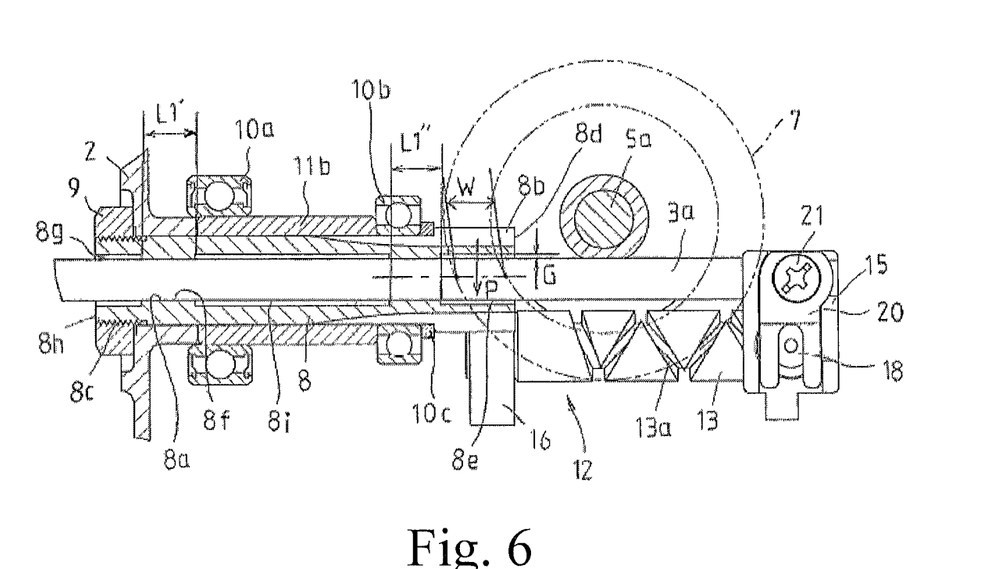
FIG. 6 shows a third embodiment of the fishing spinning reel according to the present invention, showing an enlarged view of an important portion of internal mechanism thereof.

FIG. 6 shows a third embodiment of the fishing spinning reel according to the present invention, showing an enlarged view of an important portion of internal mechanism thereof, as in FIG. 4.

In this embodiment as shown in FIG. 6, a large diameter portion 8g may extend from the front end surface 8h of the pinion gear 8 toward the slidable body, and another large diameter portion 8i may extend in the middle region. With this arrangement, the spool shaft 3a may be supported at a plurality of regions (the supporting region L1' and the supporting region L1") in front of the meshing region W. This may reduce the slide resistance and reduce the weight of the pinion gear. Further, since the supporting regions are positioned on the front end side of the pinion gear, the impact of the load on the spool shaft can be reduced.

Figure 7:
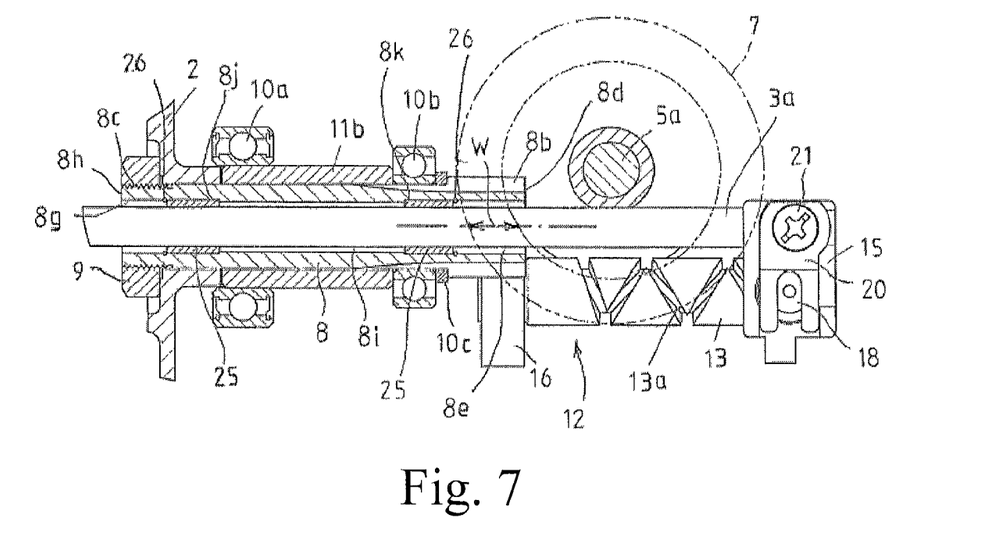
FIG. 7 shows a variation of the third embodiment, showing an enlarged view of an important portion of internal mechanism thereof.

The above supporting regions L1, L1', L1" of the pinion gear 8 supporting the spool shaft in front of the meshing region W may also be replaced with collar members as intermediates. For example, collars 25 may be provided on the portions corresponding to the supporting regions L1', L1" shown in FIG. 6 to support the spool shaft 3*a* (see FIG. 7). In this case, steps 8*j*, 8*k* may be formed between the large diameter portion 8*i* and the large diameter portions 8*g*, 8*e*; and the collars 25 can be inserted from an end surface side and positioned with retaining rings 26.

Figure 8:
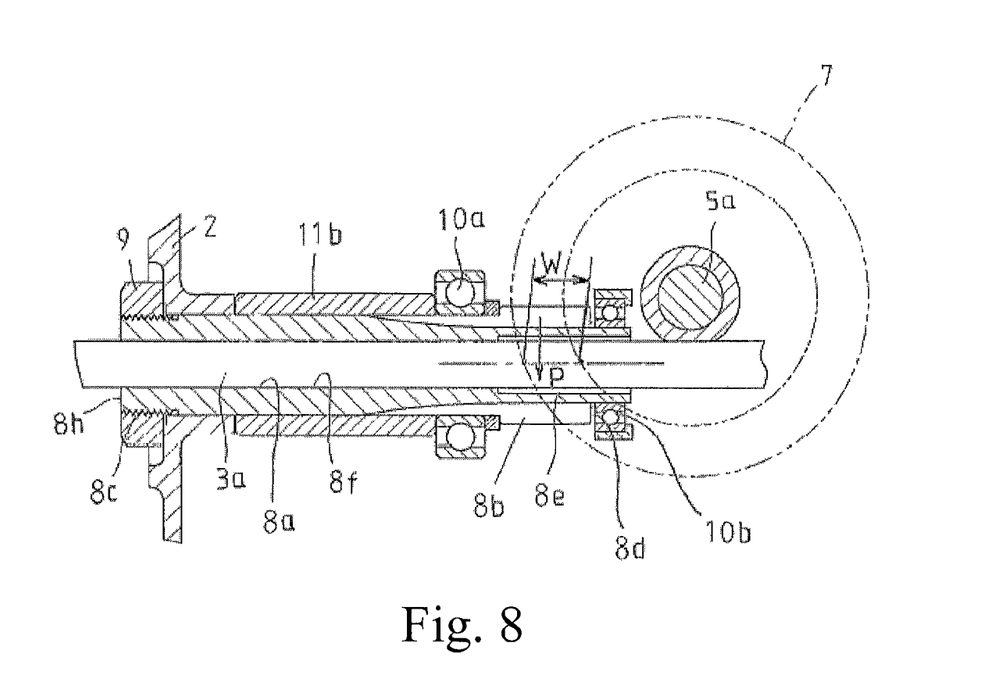
FIG. 8 shows a fourth embodiment of the fishing spinning reel according to the present invention, showing an enlarged view of an important portion of internal mechanism thereof.

FIG. 8 shows a fourth embodiment of the fishing spinning reel according to the present invention, showing an enlarged view of an important portion of internal mechanism thereof, as in FIG. 4.

The pinion gear 8 of this embodiment may be rotatably supported on the reel body 1 via bearings 10*a*, 10*b* placed in front of and behind the meshing region W. As described above, the meshing region W may be subjected to a large load P during rotational operation of the handle. Since the bearings rotatably support the pinion gear 8 on both sides of the point subjected to this large load, the pinion gear 8 may be stably supported and rotate smoothly; additionally, the impact of bending on the spool shaft 3*a* can be reduced.

Embodiments of the present invention are not limited to the above descriptions and are susceptible to various modifications. For example, the reciprocation device 12, which is reciprocated back and forth via a worm shaft in the above embodiments, may also be on a gear-oscillated basis. The spool shaft 3*a* may be supported at any points as long as the portion from the meshing region W to the slidable body is not supported. Also, the pinion gear may have a plurality of large diameter portions formed therein.

What is claimed is:

1. A fishing spinning reel comprising: a reel body;
   a pinion gear adapted to mesh with a drive gear rotationally driven by rotational operation of a handle rotatably supported on the reel body, the pinion gear having a large interior diameter portion formed therein, the large interior diameter portion extending from the rear edge of the pinion gear beyond a meshing region between the drive gear and the pinion gear;
   a spool shaft adapted to be inserted through the pinion gear;
   a spool mounted on a front end of the spool shaft, wherein the spool is adapted to hold a fishing line therearound; and
   an oscillation mechanism adapted to reciprocate the spool shaft back and forth in accordance with drive of the drive gear,
   wherein the spool shaft is supported, at its rear end, by a slidable body of the oscillation mechanism; and
   wherein the spool shaft is supported by a slidable body of the oscillation mechanism and a front inner surface of the pinion gear in front of the meshing region;
   wherein the spool shaft is not supported between the slidable body and the front inner surface of the pinion gear.

2. The fishing spinning reel of claim 1 wherein the large diameter portion including the meshing region is formed to have a length of up to 80% of the entire length of the pinion gear.

3. The fishing spinning reel of claim 1 wherein the spool shaft is supported in the pinion gear at a region excluding the meshing region.

4. The fishing spinning reel of claim 1 wherein the spool shaft is supported at a plurality of positions in the pinion gear.

5. The fishing spinning reel of claim 4 wherein the spool shaft is supported at the plurality of positions in the pinion gear via collars or bearings placed between the pinion gear and the spool shaft.

6. The fishing spinning reel of claim 1 wherein the slidable body is disposed in the reel body and is supported by two guides arranged in an axial direction of the spool shaft so as to be able to move back and forth.

7. The fishing spinning reel of claim 1 wherein the pinion gear is supported on the reel body via bearings in front of the meshing region.

8. The fishing spinning reel of claim 1 wherein the pinion gear is supported on the reel body via bearings in front of and behind the meshing region.

9. The fishing spinning reel of claim 1, wherein the large inner diameter portion has an inner diameter and a length selected such that the spool shaft, when bent under a load does not contact the inner surface of the pinion gear at the meshing region.

10. The fishing spinning reel of claim 1, wherein the large inner diameter portion extends from the meshing region to a supporting portion in the inner surface of the pinion gear.

* * * * *